July 5, 1927.
J. H. PIEPER
1,634,594
DISPENSING DEVICE
Filed Oct. 14, 1926  2 Sheets-Sheet 1
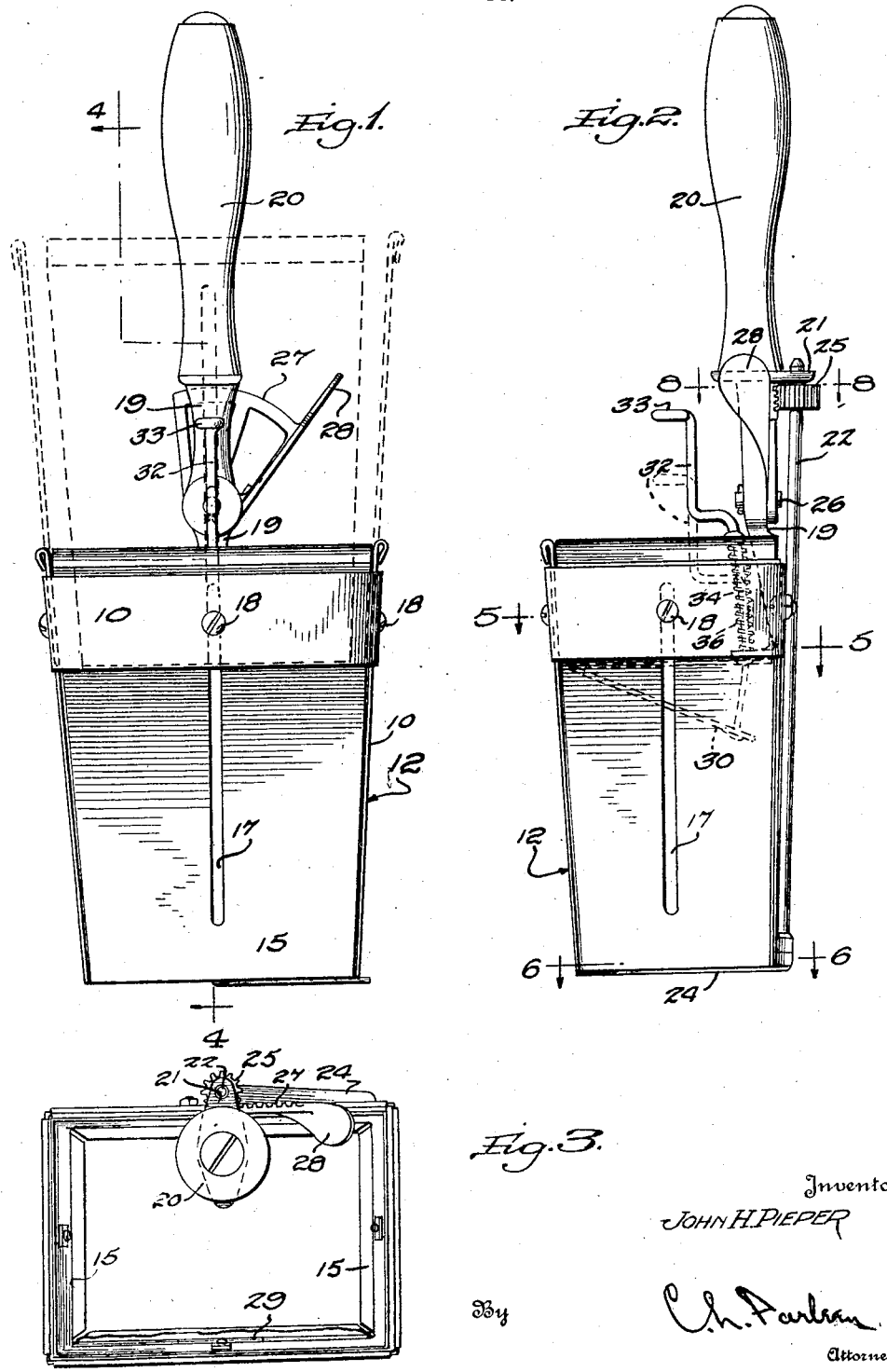
Inventor
JOHN H. PIEPER
By
Attorney July 5, 1927.

J. H. PIEPER 1,634,594

DISPENSING DEVICE

Filed Oct. 14, 1926

Inventor
JOHN H. PIEPER

By

Attorney

Patented July 5, 1927.

1,634,594

UNITED STATES PATENT OFFICE.

JOHN H. PIEPER, OF DELAVAN, MINNESOTA.

DISPENSING DEVICE.

Application filed October 14, 1926. Serial No. 141,633.

This invention relates to dispensing devices, and more particularly to a device for dispensing ice cream and the like.

An important object of the invention is to provide a dispenser which is adapted to be inserted into a can of bulk ice cream or the like and to withdraw a quantity of ice cream corresponding in shape to a standard container whereby the ice cream withdrawn from the bulk may be inserted in the container and will fit therein.

A further object is to provide a dispenser of the type referred to which readily may be inserted into the bulk ice cream or the like and from which the material readily may be dispensed into a container of the proper shape and size.

A further object is to provide a dispenser having an open bottom and a plurality of side members adapted to serve as cutting means when the device is inserted in the cream, and to provide means for cutting off the material at the bottom of the dispenser whereby the latter may be withdrawn from the bulk of the ice cream.

A further object is to provide a dispenser of the character referred to wherein all of the side walls except one are adapted to slide upwardly when the device is to be inserted into the bulk ice cream and when the ice cream is to be dispensed from the device to the container.

A further object is to provide a device of the character just mentioned having means for removing the ice cream from the device to permit it to fall into the container.

Other objects and advantages of the invention will become apparent during the course of the following description.

In the drawings I have shown one embodiment of the invention. In this showing:—

Figure 1 is a front elevation,

Figure 2 is a side elevation,

Figure 3 is a plan view,

Figure 4:
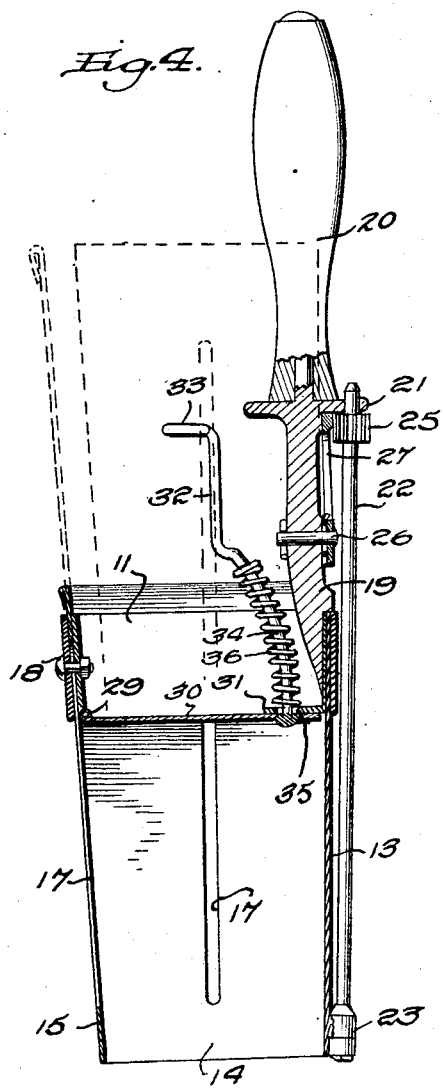
Figure 4 is a section taken substantially on line 4—4 of Figure 1, parts being shown in elevation.
Figure 5:
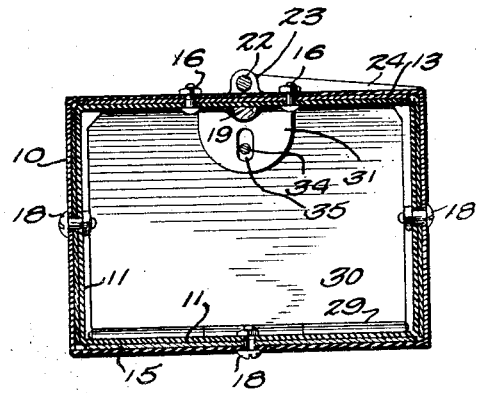
Figure 5 is a horizontal sectional view taken substantially on line 5—5 of Figure 2.
Figure 6:
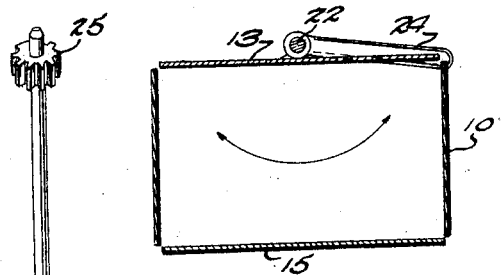
Figure 6 is a similar view on line 6—6 of Figure 2.
Figure 7:
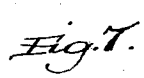
Figure 7 is a detail perspective of a portion of the cutting mechanism.
Figure 8:
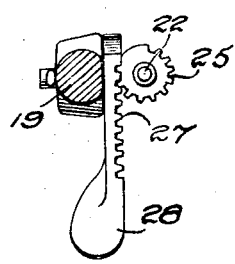
Figure 8 is a detail section on line 8—8 of Figure 2.

Referring to the drawings, the numeral 10 designates an outer supporting band in which is arranged a similar inner supporting band 11 spaced therefrom as shown in Figure 4. A body portion indicated as a whole by the numeral 12 is adapted to be supported by the bands 10 and 11. The body portion 12 comprises a rear stationary wall 13 and movable end and side walls 14 and 15 respectively. As shown in Figures 4 and 5, the rear wall 13 has its upper end arranged between the bands 10 and 11 and is secured thereto by bolts or the like 16. Each of the end and front walls 14 and 15 is provided with an elongated substantially vertical slot 17 which receives a bolt or the like 18 passing through the corresponding portions of the bands 10 and 11. It will be apparent that the upper ends of the end and side walls 14 and 15 are arranged between bands 10 and 11 and are adapted to slide vertically by virtue of the arrangement of the bolts 18 in the slots 17.

The rear portion of the inner band 11 is provided with an upstanding bracket 19 provided at its upper end with a suitable handle 20. The bracket 19 is provided adjacent its upper end with a rearwardly extending portion 21 forming an upper bearing for a shaft 22 which lies parallel and in close proximity to the rear wall 13. The lower end of the shaft 22 is rotatably supported in a bearing 23 carried by the rear wall 13. At its lower end, the shaft 22 is provided with a cutting blade 24 which is adapted to swing beneath the body portion in a manner to be described. Adjacent the bearing 21, the shaft 22 is provided with a pinion 25 by means of which the shaft 22 is adapted to be oscillated. A transverse shaft 26 is journalled on the bracket 19 as clearly shown in Figure 4, and a segment gear 27 is journalled on this shaft. The segment gear is provided with an operating handle 28, and since the teeth of the segment gear mesh with the pinion 25, it will be apparent that movement of the segment gear when the handle 28 is pressed, is adapted to operate the shaft 22.

As shown in Figure 4, the side of the band 11 adjacent the front wall 15 is provided with a hinge pin 29 to which is pivotally supported one edge of a plate 30. The opposite edge of the plate 30 normally contacts with a horizontal projection 31 extending inwardly from the rear wall of the band 11.

An operating handle 32 is provided for moving the plate 30 downwardly. The handle 32 is provided at its upper end with a finger piece 33, and the lower end of the handle is curved as at 34 on an arc of a circle having its center substantially coincident with the center of the hinge pin 29. The lower end of the curved portion 34 of the handle extends through an opening 35 formed in the projection 31, and is secured at its extremity to the plate 30. A spring 36 surrounds the curved portion of the rod and is adapted to normally maintain the plate 30 in upper position against the lower face of the projection 31.

The operation of the device is as follows:

It will be noted that the walls of the body portion 12 converge slightly toward their lower ends corresponding generally in shape to the usual ice cream boxes. The device is adapted to be made in varying sizes whereby the capacity of the body portion between the lower end thereof and the plate 30 will correspond to the capacity of the box which is to be filled. When it is desired to fill one of the boxes or containers, the end walls 14 and front wall 15 are moved upwardly substantially to the dotted line positions indicated in Figures 1 and 4. The rear wall 13 is stationary as will be apparent, and is inserted into the bulk of the ice cream by grasping the handle 20 and moving the device downwardly. The side walls 14 and front wall 15 are then pushed downwardly into the body of the cream, whereupon the operator moves the handle 28 thus revolving the shaft 22 and causing the blade 24 to swing across the bottom of the container to cut through the cream. The dispensing device is then lifted from the body of the cream and the end walls 14 and front wall 15 are moved upwardly. The device is then placed in position over a container of the proper size whereupon the handle 33 is depressed to move the plate 30 downwardly. This action removes the cream from the rear wall 13 permitting it to drop downwardly into the container. When the handle 32 is released, the spring 36 returns the plate 30 to normal position. The device is adapted to remove a block of ice cream or the like from the bulk in the can, the block corresponding exactly in shape and size to the container. The device obviates the necessity for filling a container by the use of spoons or the like. It is well known that the latter method causes a merchant to dispense actually more than the quantity of ice cream intended to be sold in the container, and accordingly the present device is not only convenient in operation but effects an actual saving of ice cream.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a body portion having an open bottom and adapted to be inserted into a body of material, means associated with said body portion and movable across the bottom thereof for cutting through the material, a plate pivotally connected adjacent one edge within and adjacent one side of said body portion and defining the capacity thereof, and means for moving the free edge of said plate downwardly.

2. A device of the character described comprising supporting means, a body portion carried by said supporting means and including a plurality of permanently flat walls, all but one of said walls being adapted to slide with respect to said supporting means, said body portion having an open bottom and adapted to be inserted into a body of material, and cutting means associated with said body portion and movable across the bottom thereof to cut through the body of material.

3. A device of the character described comprising supporting means, a body portion carried by said supporting means and including a plurality of permanently flat walls, all but one of said walls being adapted to slide with respect to said supporting means, said body portion having an open bottom and adapted to be inserted into a body of material, cutting means associated with said body portion and movable across the bottom thereof to cut through the body of material, and means carried by said supporting means for dislodging material from said body portion.

4. A device of the character described comprising supporting means, a body portion carried by said supporting means and including a plurality of rectangularly arranged walls, certain of said walls being adapted to slide with respect to said supporting means, one of said walls being stationary with respect to said supporting means, said body portion having an open bottom and adapted to be inserted into a body of material, cutting means associated with said body portion and movable across the bottom thereof to cut through the body of material, a plate arranged in said body portion and pivotally connected adjacent one edge to a portion of said supporting means, the free edge of said plate being arranged adjacent said stationary wall, said plate being adapted to define the capacity of said body portion, and means for moving the free edge of said plate downwardly.

5. A device of the character described comprising supporting means, a body portion carried by said supporting means and including a plurality of walls, one of said walls being secured in fixed position with respect to said supporting means, the others of said walls being slidable with respect to said supporting means, said body portion having an open bottom and adapted to be inserted into a body of material, and material dislodging means arranged in said body portion and having a movable portion arranged adjacent the fixed wall of said body portion.

6. A device of the character described comprising supporting means, a body portion carried by said supporting means and including a plurality of walls, one of said walls being secured in fixed position with respect to said supporting means, the others of said walls being slidable with respect to said supporting means, said body portion having an open bottom and adapted to be inserted into a body of material, material dislodging means arranged in said body portion and having a movable portion arranged adjacent the fixed wall of said body portion, and cutting means associated with said body portion and movable across the bottom thereof for cutting through the body of material in which said body portion is inserted.

7. A device of the character described comprising inner and outer spaced bands forming supporting means, a body portion including front, rear and end walls having their upper ends arranged between said bands, said rear wall being stationary with respect to said supporting means, the others of said walls being provided with slots, means passing through said supporting means and said slots whereby said last named walls are adapted to partake of sliding movement with respect to said supporting means, said body portion having an open bottom and adapted to be inserted into a body of material, a shaft arranged adjacent said stationary wall, a cutting member carried by the lower end of said shaft and movable across the bottom of said body to cut through the body of material, and means for operating said shaft.

8. A device of the character described comprising inner and outer spaced bands forming supporting means, a body portion including front, rear and end walls having their upper ends arranged between said bands, said rear wall being stationary with respect to said supporting means, the others of said walls being provided with slots, means passing through said supporting means and said slots whereby said last named walls are adapted to partake of sliding movement with respect to said supporting means, said body portion having an open bottom and adapted to be inserted into a body of material, a shaft arranged adjacent said stationary wall, a cutting member carried by the lower end of said shaft and movable across the bottom of said body portion to cut through the body of material, means for operating said shaft, a plate arranged in said body portion and adapted to define the capacity thereof, said plate being hinged at one edge to said supporting means adjacent the front wall of said body portion, a horizontal projection extended inwardly from said supporting means adjacent said stationary wall and provided with an opening, a rod carried by said plate adjacent its free edge and extending upwardly through said opening, and resilient means connected between said rod and said projection for normally maintaining said plate in contact with the lower face of said projection.

In testimony whereof I affix my signature.

JOHN H. PIEPER.